United States Patent [19]
Bartusiak et al.

[11] Patent Number: 5,744,207
[45] Date of Patent: Apr. 28, 1998

[54] ARTICLES COATED WITH ELECTROPHOTOGRAPHIC TONER RECEPTIVE RELEASE COATINGS

[75] Inventors: Joseph T. Bartusiak, Brooklyn Park; Steven S. Kantner, St. Paul; Ramesh C. Kumar, Maplewood; Timothy A. Mertens, Woodbury, all of Minn.

[73] Assignee: Minnesota Mining and Manufacturing Company, St. Paul, Minn.

[21] Appl. No.: 752,821

[22] Filed: Nov. 21, 1996

Related U.S. Application Data

[60] Division of Ser. No. 525,398, Sep. 8, 1995, abandoned, which is a continuation-in-part of Ser. No. 247,344, May 23, 1994, abandoned, which is a continuation of Ser. No. 40,876, Mar. 31, 1993, abandoned.

[51] Int. Cl.$^6$ ...................................... A61F 13/02
[52] U.S. Cl. .................... 428/41.8; 428/447; 428/448; 428/452
[58] Field of Search ...................... 428/447, 448, 428/452, 41.8

[56] References Cited

U.S. PATENT DOCUMENTS

| | | | |
|---|---|---|---|
| 4,492,410 | 1/1985 | Schlusener et al. | 299/43 |
| 4,876,169 | 10/1989 | Gruber et al. | 430/110 |
| 4,915,994 | 4/1990 | Begelfer et al. | 428/40 |
| 5,026,606 | 6/1991 | Isbrandt et al. | 428/421 |
| 5,032,460 | 7/1991 | Kantner et al. | 428/449 |
| 5,102,737 | 4/1992 | Josephy et al. | 428/411.1 |
| 5,232,893 | 8/1993 | Kawasaki et al. | 503/227 |
| 5,314,861 | 5/1994 | Morohoshi et al. | 503/227 |

FOREIGN PATENT DOCUMENTS

| | | | |
|---|---|---|---|
| 2047528 | 1/1992 | Canada | C08F 283/12 |
| 0 371 633 A2 | 6/1990 | European Pat. Off. | C09J 7/02 |
| 0 421 588 A2 | 4/1991 | European Pat. Off. | C08F 283/12 |
| 0 507 998 A1 | 10/1992 | European Pat. Off. | D21H 10/60 |
| 0 618 509 A1 | 10/1994 | European Pat. Off. | G03G 7/00 |
| 93/23009 | 11/1993 | WIPO | A61K 7/48 |
| 94/19420 | 9/1994 | WIPO | C09J 7/02 |
| 95/03776 | 2/1995 | WIPO | A61K 7/06 |

*Primary Examiner*—Melvyn I. Marquis
*Attorney, Agent, or Firm*—Carolyn V. Peters

[57] ABSTRACT

An article that is capable of accepting and anchoring printed indicia and yet, maintains good release properties. The article of the present invention is coated with a release agent on a substrate such as paper. Release coatings receptive to toner particles emitted by electrophotoconductive devices comprise a polymer having at least one vinyl polymeric segment having a $T_g$ between −10° C. and 65° C. and at least one siloxane polymeric segment.

7 Claims, 3 Drawing Sheets

ARTICLES COATED WITH ELECTROPHOTOGRAPHIC TONER RECEPTIVE RELEASE COATINGS

CROSS-REFERENCE TO RELATED APPLICATIONS

This is a division of application Ser. No. 08/525,398 filed Sep. 8, 1995 now abandoned, which is a continuation-in-part of U.S. Ser. No 08/247,344, filed May 23, 1994, now abandoned, which is a continuation of Ser. No. 08/040,876, filed Mar. 31, 1993, now abandoned.

FIELD OF THE INVENTION

The present invention relates to release coatings and articles coated with such release coatings. In particular, the present invention relates to release coatings which anchor printed indicia, even when contacting a repositionable pressure-sensitive adhesive.

BACKGROUND OF THE INVENTION

A well known note pad comprises a stack of paper sheets, each having a narrow strip of low-tack pressure-sensitive adhesive adjacent one edge on its rear side by which the sheets can be temporarily adhered to substrates such as documents or other articles (often for message-bearing purposes), by which strip of adhesive the sheets are adhered together in the pad. In one pad configuration, all of the strips of adhesive are along one side of the note pad, whereas in another pad configuration the adhesive strip on each successive sheet in the pad is along the opposite side of the pad as is illustrated in U.S. Pat. No. 4,416,392. Note pads in both of these configurations are currently being marketed under the trademark "Post-it" by Minnesota Mining and Manufacturing Company, St. Paul, Minn.

A number of conventional electrophotoconductive devices such as printers and copiers employ dry toner. These printers and/or copiers employ toner to form a latent image transferable from an imaging device to a substrate such as paper, tag or label stock. The toned latent image is then subjected to heat fusing in order to obtain the best print quality and toned image density.

Although the resulting images are often of good quality, there are problems associated with the imaging processes employed by printers and/or copiers. For example, there is the problem of backgrounding which is the accumulation of various unwanted materials such as toner particles on the substrate.

Other conventional devices for office and commercial printing employ inks containing pigments or inks along with a carrier vehicle. Examples of such printing devices are ink jet, offset, flexographic, duplicators, and electrophotographic printers. The images are applied to the substrate, and the vehicle is absorbed into the substrate and evaporates. Occasionally, the substrate may be subjected to heat to enhance evaporation of the ink vehicle.

Problems with such printers include "ghosting", in which ink transfer to the substrate is incomplete. Typically, the residual ink is transferred to another roller in the printer and subsequently transferred to the substrate out of register. This results in a lightly colored image. Additional problems with ink jet printing is the tendancy of ink to dewet from the substrate, and failure to absorb into the substrate or dry. In either case, the ink is smeared when a subsequent sheet contacts the image.

When printed sheets are formed into note pads, a release coating is typically used to provide facile removal of the sheets from pads. Such a release coating must be receptive to common writing instruments and printing inks (see U.S. Pat. No. 5,154,962 columns 1 and 2 related background). The release coating is selected to permit high quality images with specific printing technologies and ready separation from the adhesive.

It has long been industry practice for commercial printing to employ offset printing devices located in centralized production facilities. However, desktop publishing and electronic commerce is rapidly changing the printing industry away from centralized production with a single printing technology to decentralized production using various and multiple printing technologies. For instance, a printing requirement may require both offset printing (e.g., a company logo) followed by xerographic customization (e.g., a person's name).

In any event, the release-coated substrate must accept and firmly anchor indicia. The coated substrate must first accept the inidicia without "backgrounding" in electrophotographic devices, "ghosting" in some printers, or smearing in liquid ink printers. Additionally, when formed into pads, the printed indicia must firmly anchor to the substrate without transferring to the adhesive of the preceding note in the pad.

Coatings have been prepared to enhance ink or toner particle receptivity. World Patent Application No. US/90/03286 (Josephy et al.) describes a toner receptive coating which can be applied to paper. U.S. Pat. No. 5,154,962 describes indicia receptive release coatings which are particularly useful for writing with pens containing waterbased inks. However no known references teach the use of a release coating which accepts and firmly anchors indicia from a wide array of devices including offset, ink jet, and xerographic printers. Frequently, customization is performed using sheetfed devices such as laser printers, ink jet printers, and xerographic copiers. This printing is useful when preparing printed note pads. Such pads may be prepared using the structures and methods described in U.S. Pat. No. 5,382,055. Thus, there currently exists a need for a release coating which will accept and anchor toner particles, offset inks, and other liquid inks and toners.

SUMMARY OF THE INVENTION

The present invention comprises articles coated release coatings that are capable of accepting and anchoring printed indicia and yet, maintains good release properties. The release coating of the present invention is coated onto a substrate such as paper. The articles are of the form described in U.S. Pat. No. 5,382,055 and are useful to prepare a small amount of notes or note pads. The release coating comprises a polymer having at least one vinyl polymeric segment having a $T_g$ between $-10°$ C. and $65°$ C. and at least one siloxane polymeric segment. Preferably, the Tg should be between 200 C. and 450 C. of the vinyl polymer segment.

In one embodiment of the present invention, the coating is a copolymer which comprises the formula:

wherein $R_1$ are monovalent moieties which can independently be the same or different and are selected from the group consisting of alkyl, aryl, alkaryl, alkoxy, alkylamino, hydroxyl, hydrogen, and fluoroalkyl;

$R_2$ can independently be the same or different and are divalent linking groups;

$R_3$ are monovalent moieties which can independently be the same or different and are selected from the group consisting of alkyl, aryl, alkylaryl, alkoxy, alkylamino, hydroxyl, hydrogen, and fluoroalkyl;

$R_4$ can independently be the same or different and are divalent linking groups;

x is an integer of 0 to 3;

y is an integer of 10 or greater;

q is an integer of 0 to 3;

$G_5$ and $G_6$ are monovalent moieties which can independently be the same or different selected from the group consisting of alkyl, aryl, alkaryl, alkoxy, alkylamino, fluoralkyl, hydrogen, and -WSA wherein W is a divalent linking group and A is defined below; and $G_2$ and $G_4$ are A wherein A is a vinyl polymeric segment or block consisting essentially of a polymerized free radically polymerized monomer.

In another embodiment of the present invention, the coating comprises a copolymer of D and E monomers copolymerized to form a polymeric backbone with F monomer grafted thereto wherein:

D is at least one free radically polymerizable vinyl monomer;

E is at least one polar monomer copolymerizable with D, the amount of E being up to 30% of the total weight of all monomers, and F is a monomer having the general formula
X—$(Y)_n$Si$R_{(3-m)}Z_m$ wherein X is a vinyl group copolymerizable with the D and E monomers.

Y is a divalent linking group where n is zero or 1;

m is an integer of 1 to 3;

R is hydrogen, lower alkyl (e.g., methyl, ethyl, or propyl), aryl (e.g., phenyl or substituted phenyl), or alkoxy groups; and z is a monovalent siloxane polymeric moiety having a number average molecular weight above about 1,000 and is essentially unreactive under copolymerization conditions.

The present invention also includes a toner receptive article comprising a liner, a release coating and a substrate such as a label mounted over the liner.

DESCRIPTION OF THE PREFERRED EMBODIMENT(S)

The present invention includes an article coated with a release coating that is capable of anchoring toner. The release coating has at least one siloxane polymeric segment and at least one vinyl polymeric segment having a $T_g$ between −10° C. and 65° C. By virtue of its chemical composition and structure and the resultant properties, the release coating is well-suited to control toner anchorage applications. In particular, it is thought that the silicone segment presents a low energy, "siliconized" release surface and the higher energy vinyl polymeric segment provides the adhesion for the toner particles.

In one embodiment of the present invention, the coating is a copolymer which comprises the formula:

$$\begin{array}{c} (R_1)_{3-x} \\ (G_2SR_2)_x \end{array} Si-(OSi)_y-OSi \begin{array}{c} (R_3)_{3-q} \\ G_6 \end{array} (R_4SG_4)_q$$

$R_1$ are monovalent moieties which can independently be the same or different which are selected from the group consisting of alkyl, aryl, alkylaryl, alkoxy, alkylamino, hydroxyl, fluoroalkyl, and hydrogen. Preferably, $R_1$ are monovalent moieties which can independently be the same or different selected from the group consisting of $C_{1-4}$ alkyl and hydroxyl. Most preferably, R, is selected from the group consisting of methyl and butyl.

$R_2$ are divalent linking groups which can independently be the same or different. Suitable divalent linking groups include but are not limited to the following: $C_1$ to $C_{10}$ alkylene, arylene, alkylarylene and alkoxyalkylene. Preferably, $R_2$ is selected from the group consisting of $C_{1-3}$ alkylene and $C_7$–$C_{10}$ alkylarylene due to ease of synthesis of the compound. Most preferably, $R_2$ is selected from the group consisting of —$CH_2$—; 1,3-propylene; and $$-CH_2-\langle\bigcirc\rangle-CH_2CH_2-$$

$R_3$ are monovalent moieties which can independently be the same or different which are selected from the group consisting of alkyl, aryl, alkaryl, alkoxy, alkylamino, hydroxyl and fluoroalkyl, and hydrogen. Preferably, $R_3$ are monovalent moieties which can independently be the same or different selected from the group consisting of $C_{1-4}$ alkyl and hydroxyl. Most preferably, $R_3$ is selected from the group consisting of methyl and butyl.

$R_4$ are divalent linking groups which can independently be the same or different. Suitable divalent linking groups include but are not limited to the following: $C_1$ to $C_{10}$ alkylene, arylene, alkylarylene and alkoxyalkylene. Preferably, $R_4$ is selected from the group consisting of $C_{1-3}$ alkylene and $C_7$–$C_{10}$ alkylarylene for reasons of ease of synthesis. Most preferably, $R_4$ is selected from the group consisting of —$CH_2$—; 1,3-propylene; and $$-CH_2-\langle\bigcirc\rangle-CH_2CH_2$$

$G_5$ and $G_6$ are monovalent moieties which can independently be the same or different selected from the group consisting of alkyl, aryl, alkylaryl, alkoxy, alkylamino, fluoralkyl, hydrogen, and -WSA wherein W is a divalent linking group and A is defined below.

W are divalent linking groups. Suitable divalent linking groups include, but are not limited to, $C_1$ to $C_{10}$ alkylene, alkarylene, arylene, and alkoxyalkylene. Preferably, W is selected from the group consisting of methylene and propylene.

$G_2$ and $G_4$ are the same or different and comprise A. A is a vinyl polymeric segment consisting essentially of polymerized free radically polymerizable monomer. A can comprise either a homopolymer segment or block or a copolymer segment or block. The toner anchorage properties of the coating are determined by the vinyl polymeric segment content. The chemical nature or composition of the vinyl polymeric segments can be modified independent of the release aspect to improve toner anchorage and adhesion to the substrate. Thus, the release coating can be chemically tailored to provide a specific level of toner anchorage. The selection of the composition of A is typically based upon the intended use of the release coating and the properties the release coating must possess in order to accomplish its intended purpose.

A can include, but is not limited to, those monomers wherein the free radically polymerizable monomer or monomers are chosen such that a vinyl segment has a $T_g$ or $T_m$ above about $-20°$ C. The preferred free radically polymerizable monomers are selected from the group consisting of styrene, methyl methacrylate, methyl acrylate, acrylic acid, methacrylic acid, acrylonitrile, isobornyl acrylate, isobornyl methacrylate, N-vinyl pyrrolidone, butyl methacrylate, isopropyl methacrylate, vinyl acetate, hydroxy propylacrylate, hydroxy ethyl acrylate and mixtures thereof.

The amount and composition of the vinylic segment to silicone should range from about 98 to about 2 parts preferably, from about 40 to about 60 parts by weight. It is preferred that the vinyl polymeric segments should have a molecular weight in the range of 2,000 to 80,000, more preferably 5,000 to 50,000.

The release properties of the coating are determined by both the silicone content (weight percentage) present in the copolymer and the molecular weight of the silicone segment, with higher silicone content and/or molecular weight providing easier release. A copolymer or copolymer blend can, therefore, be chemically tailored to provide a specific level of release which can be reproduced with consistency, thus making possible the variation of the release properties of a liner over a range of values in a controlled fashion.

The silicone polymeric segment must have an average molecular weight above about 1000 in order for the release coating to function properly. Preferably, the silicone polymeric segment has a number average molecular weight of about 1000 to about 20,000. Most preferably, the silicone polymeric segment has a number average molecular weight ranging from about 2,000 to about 15,000. The silicone polymeric segment can comprise about 2 to 60 wt % of the release coating in order to allow for a wide range of release performance.

In another embodiment of the present invention, the release coating comprises a copolymer of D and E monomers copolymerized to form a polymeric backbone. Grafted to the backbone is an F monomer. The D and E monomers provide the toner anchorage properties of the coating and the F monomer provides the release properties.

The D monomer or monomers (there may be more than one) are chosen such that the backbone $T_g$ or $T_m$ is above about $-20°$ C. Representative examples of D monomers include styrene, vinyl acetate, vinyl chloride, vinylidene chloride, acrylonitrile and acrylic or methacrylic acid esters of nontertiary alcohols or tertiary alcohols such as methanol, ethanol, propanol, isopropanol, butanol, isobutanol, cyclohexanol, benzyl alcohol, dodecanol, hexadecanol, and octadecanol, the alcohols having from 1 to 18 carbon atoms.

Especially preferred D monomers include methyl methacrylate, butyl methacrylate, vinyl acetate, partially hydrolyzed vinyl acetate, methyl acrylate and octadecyl acrylate.

Representative E monomers useful in practicing the invention, and which may be used either individually or in combination, include carboxylic acids such as acrylic acid, methacrylic acid, itaconic acid, maleic acid, fumaric acid, and 2-carboxyethyl acrylate and their ammonium or metal salts; sulfonic or phosphonic acids such as 2-sulfoethyl methacrylate, 3-sulfopropyl acrylate, 3-sulfopropyl methacrylate, styrene sulfonic acid, and vinyl benzyl phosphonic acid and their ammonium or metal salts; amides such as acrylamide, methacrylamide, N,N-dimethyl acrylamide, and N-vinyl pyrrolidone; and monomers having hydroxyl functionality (e.g., 2-hydroxyethyl acrylate, 2-hydroxyethyl methacrylate, hydroxypropyl acrylate, and dihydroxypropyl acrylate), ammonium functionality derived from reaction of amine-containing monomers (e.g., N,N-dimethylaminoethyl methacrylate and vinyl pyridine) with alkylating agents or protic acids, or zwitterionic functionality such as that derived by reaction of amine monomers with hydrogen peroxide or propane sulfone.

The F monomer has the general formula:

X is a vinyl group copolymerizable with the D and E monomers.

Y is a divalent linking group.

R comprises hydrogen, lower alkyl groups such as methyl, ethyl, or propyl, aryl groups such as phenyl or substituted phenyl and alkoxy groups such as methoxy and ethoxy groups.

Z is a monovalent siloxane polymeric moiety having a number average molecular weight above about 1,000 and is essentially unreactive under copolymerization conditions.

The preferred F monomer may be further defined as having an X group which has the general formula wherein $R^1$ is a hydrogen atom or a COOH group and $R^2$ is a hydrogen atom, a methyl group, or a $CH_2COOH$ group.

The Z group of the F monomer has the general formula where $R^3$ and $R^5$ are independently lower alkyl, aryl, or fluoroalkyl, where lower alkyl and fluoroalkyl both refer to alkyl groups having from one to three carbon atoms and where aryl refers to phenyl or substituted phenyl. $R^4$ may be alkyl, alkoxy, alkylamino, aryl, hydroxyl, or fluoroalkyl, and r is an integer from about 5 to about 700. Preferably, the F monomer has a general formula selected from the group consisting of the following, where m is 1, 2 or 3, p is zero or 1, R" may be alkyl or hydrogen, and X, R, and Z are as defined above:

wherein q is an integer from 2 to 6;

wherein q is an integer from zero to 2;

wherein q is an integer from 2 to 6;

wherein q is an integer from 2 to 6.

The release coating of the present invention may comprise the copolymers of the two embodiments alone, or may comprise copolymers blended with other compatible homopolymers and/or copolymers. The low percentage of silicone contained in the copolymers makes the copolymers readily compatible with polymers of similar composition to the vinyl Polymeric blocks or segments. In addition, there are several pairs of dissimilar polymers that yield compatible blends due to specific interaction as described by S. Krause in *Polymer Blends*, Academic Press, New York, 1978. Introduction of a low level of silicone block onto one of these polymers will not influence compatibility.

In addition, additives, fillers or pigments such as alumina, silica, titanate, or calcium carbonate may, of course, be added to the copolymer compositions.

The release coating of the present invention should provide sufficient anchorage to anchor at least 50% of the toner. It is understood that "substantially" means at levels of at least 50%. More preferably, it should anchor at least 70% of the toner.

In addition, the release coating should have a surface release value not greater than about 10 oz./in (11 N/dm). It should be understood that this upper limit applies to use with highly aggressive pressure-sensitive adhesives (PSAs) which have peel adhesion values of 45N/dm or higher. PSAs as a group fall into three broad categories (1) low (5–15N/dm), (2) intermediate (25–50N/dm), and (3) high (60–100 plus N/dm) peel adhesion ranges. It is apparent that the degree of release can be selected to match the aggressiveness of the PSA with which it will be in contact and it is only for the most aggressive PSAs that a release value as high as 10 oz/in. (11N/dm) would be selected. Release coatings for less aggressive PSAs would be selected to be correspondingly lower.

The release compositions do not require curing or crosslinking; however, if solvent resistance is desired for a particular application, crosslinking can be effected by standard methods well-known in the art, such as radiation curing (electron beam or ultraviolet light) or chemical crosslinking.

The release coating compositions may be applied to any suitable backing or liner by means of conventional coating techniques such as wire-wound rod, direct gravure, offset gravure, reverse roll, air-knife and trailing blade coating. Suitable liners include paper, non-woven fabrics and films of thermoplastic resins such as polyesters, polyamides, polyolefins, polycarbonates and polyvinyl chloride.

In addition, any substrate which can be applied to a liner by a pressure sensitive adhesive can be utilized. For example, paper is a suitable substrate.

In a preferred embodiment, the release coating of the present invention is utilized as a component of label stock. In this preferred embodiment, one or more non-continuous substrates such as labels are adhered to protective liner by a suitable adhesive. To permit the substrate to be removed from the liner, the release coating of the present invention is coated the liner.

Figure 3:
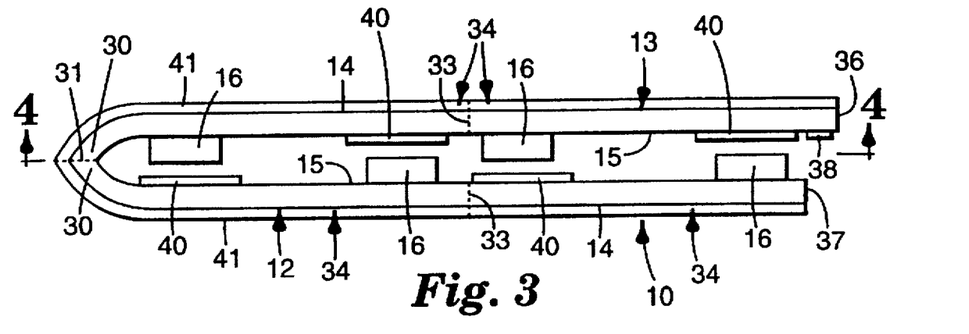
FIG. 3 is an edge view of a sheet assembly according to the present invention.

A particularly useful configuration is a sheet assembly wherein the assembly can be described as follows and in reference to FIGS. 3 and 4. The sheet assembly 10 is illustrated with release coatings 40 on at least one nonadhesive bearing area of the rear surfaces 15 of the sheets 12 and 13. The release coatings 40 can be applied strips and are slightly wider than strips 16 of adhesive, and extend transversely of the sheets 12 and 13 parallel to the edges 30, 36 and 37 with each strip release coating 40 being adjacent and extending along an edge of a portion 34 of the sheet 12 and 13 that will be formed by separating the sheets 12 and 13 along the paths of weakness 31 and 33, and in a position such that when the rear surfaces 15 of the sheets are placed face to face as illustrated in FIG. 3, the strip layers 16 of the adhesive will contact and will be generally centered on the strip release coatings 40. Also, as illustrated, the entire front surface 14 of each of the sheets 12 and 13 is coated with a release coating 41, although such a coating is not necessarily required. For example, the illustrated release coatings 40 on the rear surfaces 15 and the release coatings 41 on the front surface 14 of the sheets 12 and 13 are not needed when the layers 16 of the adhesive are of low-tack or repositionable adhesive (e.g., the low-tack adhesives based on tacky, elastomeric copolymer microspheres disclosed in U.S. Pat. Nos. 3,961,140 and 3,857,731). The use of the release coatings 40 and 41 allows the use of layers 16 of pressure-sensitive adhesive that are more aggressive or permanent than repositionable adhesive. Suitable release coatings 40 and 41 are materials and treatments those of the present invention. Even with layers 16 of aggressive pressure-sensitive adhesive the release coatings 40 and 41 might not be required if the sheets 12 and 13 are of a material, or are impregnated with the release material, from which the layer 16 of adhesive readily releases.

Figure 4:
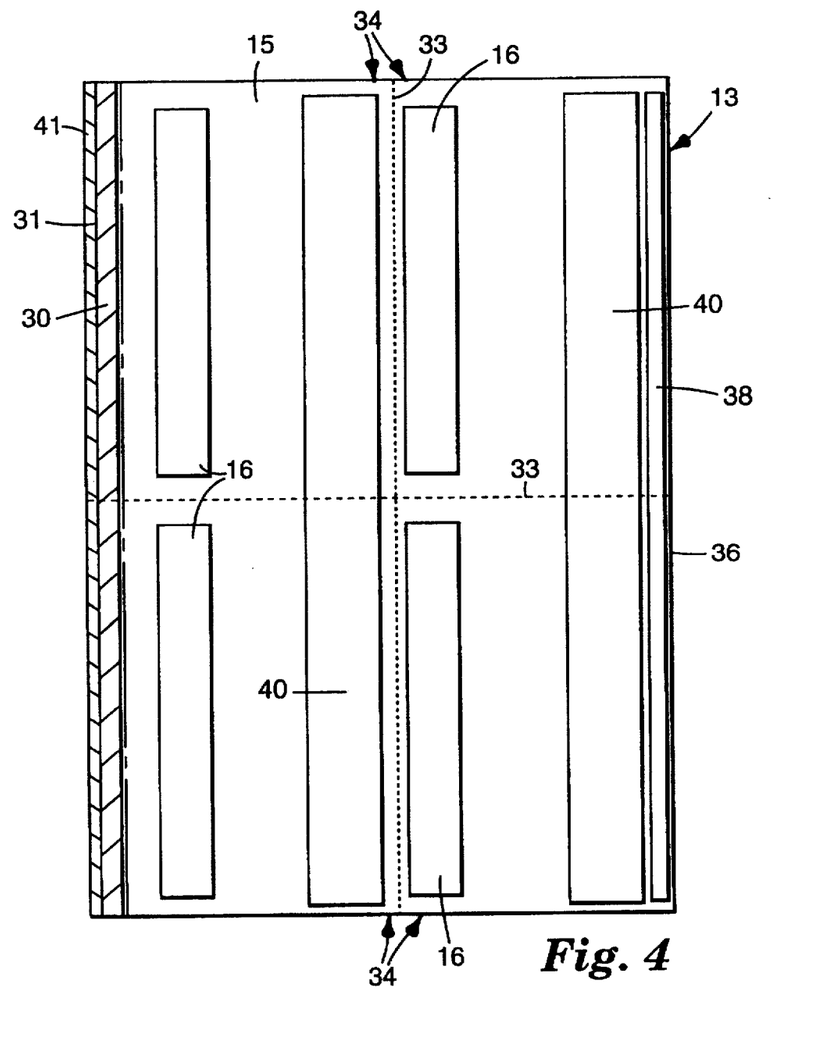
FIG. 4 is a reduced sectional view taken approximately along line 4—4 of FIG. 3.

While FIGS. 3 and 4 represent a particular configuration of a sheet assembly, such illustrations and descriptions are merely illustrative of the present invention and other embodiments could be contemplated to be within the scope of this invention.

The following examples are illustrative in nature and are not intended to limit the invention in any way.

TEST SAMPLES

The polymer solutions of Examples 1 to 19 discussed below were diluted to 15% solids in distilled water. The solutions were then coated onto commercially available roll base paper with a gravure roll having a pyramidal pattern of 200 cells per inch. A two roll direct gravure coating was applied to each sample. Two different roll base papers were utilized. Supercalendered CIS paper supplied by the Simpson Paper Company was coated with the diluted polymer solutions of Examples 1 to 4 and machine glazed base paper sold by Akrosil were coated with the diluted polymer solutions of Examples 4 to 19. After coating, the base papers were dried at 77° C.

TEST METHODS

Release Properties

The release property of an adhesive refers to ease that an adhesive separates from another surface. It is the force required to remove a flexible adhesive tape from a test sample at a specific angle and rate of removal. It is measured in Newtons per decimeter (N/dm). Two test methods are used to evaluate the release and indicia anchorage properties of coated flexible sheet materials. Both tests are modified versions of the industry standard peel adhesion test ASTM D3330-78 PSTC 1 and 3 used to evaluate PSA coated materials. The two modified release property tests are described below.

1. Release Value

Each test sample was conditioned overnight at constant temperature (22° C.) and humidity (50% RH). Thereafter, a 5.08 cm by 25.4 cm strip of the test sample is laminated to a constant 90° angle jig commercially available as the Deltron Ball Slide from the J. R. Brass Co. of Eden Prairie, Minn. with double coated tape. Then a 2.54 cm strip of a PSA coated (#810 tape, commercially available from the assignee of this application) test tape was rolled down onto the laminate with a 1.82 kg rubber roller. The force required to remove this tape at 90° and 30.5 cm/minute was then measured was measured by a Sintech/Instron Tensile Tester System commercially available from Sintech Corporation, a division of MTS Systems Corporation, Research Triangle Park, N.C.

2. Toner Receptivity Testing

The toner receptivity of the test samples was assessed by printing on a 21.6 cm×27.9 cm test sample an asterisk pattern, i.e., (****), in an Hewlett Packard LaserJet II printer. The imaged coated sheets then sat overnight in a controlled environment of 21° C. and 50% RH. Thereafter, a 2.54 cm×25.4 cm strip of Scotch™ Brand 810™ tape manufactured by the Minnesota Mining and Manufacturing Company was rolled down over the imaged test samples using two passes of a 1.82 kg rubber roller. After the two passes, the test samples were allowed to sit in a controlled environment of 21° C. and 50% RH for 24 hours. Then the Scotch™ Brand 810™ tape was laminated image side up to the stage of in TIMI Release and Adhesion Tester sold by Testing Machines Inc. of Mityville, N.Y. with double coated tape. The 810™ tape was then removed at a peel angle of 180° C. at 3048 cm/minute. Image analysis was used to determine the amount of indicia which remained anchored to the coated sheet.

Abbreviations

AA—acrylic acid
AIBN—2-21-azobisbutyronitrile
BMA—butyl methacrylate
EMA—ethyl methacrylate
IPA—isopropyl alcohol
KF2001—a mercaptofunctional dimethyl siloxane with 4–5 mole % mercapto functionality commercially available from Shin-Etsu.
MA—methacrylic acid
MAA—methyl acrylate
MEK—methyl ethyl ketone
MMA—methyl methacrylate
ODA—octadecyl acrylate

EXAMPLE 1

The composition of Example 1 was prepared in the following manner:

First, a solvent borne sample was prepared by charging a 32 oz. reaction bottle with 45 grams of mercaptofunctional dimethyl siloxane with 4–5 mole mercapto functionality commercially available as KF-2001 from Shin-Etsu, 169 grams of methyl acrylate, 11 grams acrylic acid, 335 grams of methyl ethyl ketone (MEK) and 0.56 grams 2-2'-azobisisobutyronitrile (AIBN). The solution mixture was then purged with nitrogen for 2 minutes at a rate of 1 L/min, after which the bottle was sealed. The sealed bottle containing the clear solution was tumbled in a constant temperature bath for 20 hours at 55° C. resulting in a viscous cloudy white solution.

Thereafter, a waterborne solution was prepared by filling a gallon jar with 860 grams deionized (DI) water and 9 grams $NH_4OH$. Next, 537 grams of the solvent borne solution (40.0% solids) was added to the solution in the gallon jar. The resulting solution was placed on a shaker and shaken for one-half hour in order to complete the neutralization. The MEK was then stripped from the resulting viscous solution on a rotary evaporator at 40° C. using an aspirator vacuum to yield 19.0% solids aqueous solution. An additional amount of DI water was added to obtain 15.0% solids solution. The ingredients utilized in forming a solvent borne solution and water borne solution and the amount of the ingredients utilized are reported in Tables 1 and 2 respectively. The ingredients of the release coating, the weight percentage of the ingredients and the test results are reported in Table 3.

EXAMPLES 2–20

The copolymers of Examples 2–20 were prepared in accordance with the procedure outlined in Example 1. The ingredients utilized in forming a solvent borne solution and water borne solution and the amount of the ingredients utilized are reported in Tables 1 and 2 respectively. The ingredients of the release coating, the weight percentage of the ingredients and the test results are reported in Table 3.

TABLE 1

| Example | Ingredients Utilized in Polymerization | Amount of Ingredients Utilized (gms.) |
|---|---|---|
| 1 | KF2001/MA/AA/MEK/AIBN | 45/169/11/335/0.56 |
| 2 | KF2001/MA/AA/MEK/AIBN | 25/70/10/157.5/0.52 |
| 3 | KF2001/MA/AA/MEK/AIBN | 50/140/20/315/0.53 |
| 4 | KF2001/MA/MAA/MEK/AIBN | 50/140/10/300/0.5 |
| 5 | KF2001/MA/MAA/MEK/AIBN | 52/182/26/390/0.65 |
| 6 | KF2001/MA/MAA/MEK/AIBN | 62/173/25/390/0.65 |
| 7 | KF2001/MA/MAA/MEK/AIBN | 60/140/20/330/0.55 |
| 8 | KF2001/MA/MAA/MEK/AIBN | 60/140/10/315/0.53 |
| 9 | KF2001/MA/MAA/MEK/AIBN | 50/120/10/300/0.5 |
| 10 | KF2001/MA/MAA/MMA/MEK/AIBN | 65/130/13/52/390/0.65 |
| 11 | KF2001/MA/MAA/MMA/MEK/AIBN | 30/75/7.5/37.5/225/0.38 |
| 12 | KF2001/MA/MAA/MMA/MEK/AIBN | 37.5/60/7.5/45/225/0.38 |
| 13 | KF2001/MA/MAA/MMA/MEK/AIBN | 37.5/45/7.5/60/225/0.38 |
| 14 | KF2001/MA/MAA/MMA/MEK/AIBN | 37.5/30/7.5/75/225/0.38 |
| 15 | KF2001/MA/MAA/MMA/ | 39.5/71/7.9/31.6/225/0.38 |

TABLE 1-continued

| Example | Ingredients Utilized in Polymerization | Amount of Ingredients Utilized (gms.) |
|---|---|---|
| 16 | KF2001/MA/MAA/MMA/MEK/AIBN | 35.7/78.6/7.1/28.6/225/0.38 |
| 17 | KF2001/MA/MAA/MMA/MEK/AIBN | 34.1/81.8/6.8/27.3/225/0.38 |
| 18 | KF2001/MA/MAA/MMA/MEK/AIBN | 32.6/84.8/6.5/26.1/225/0.38 |
| 19 | KF2001/MA/MAA/MMA/MEK/AIBN | 31.2/87.5/6.2/25/225/0.38 |
| 20 | KF2001/MA/MAA/MMA/MEK/AIBN | 50/100/10/40/300/1.0 |

TABLE 2

| Example | Ingredients Utilized In Preparation of Water-borne Solution | Amount of Ingredients Utilized (gms.) |
|---|---|---|
| 1 | Polymer[1]/NH$_4$OH/H$_2$O | 537/9/860 |
| 2 | Polymer/NH$_4$OH/H$_2$O | 537/9.0/645 |
| 3 | Polymer/NH$_4$OH/H$_2$O | 520/8.8/650 |
| 4 | Polymer/NH$_4$OH/H$_2$O | 326/5/540 |
| 5 | Polymer/NH$_4$OH/H$_2$O | 320/9/500 |
| 6 | Polymer/NH$_4$OH/H$_2$O | 320/8/500 |
| 7 | Polymer/NH$_4$OH/H$_2$O | 321/540/9 |
| 8 | Polymer/NH$_4$OH/H$_2$O | 325/5/540 |
| 9 | Polymer/NH$_4$OH/H$_2$O | 317/5/540 |
| 10 | Polymer/NH$_4$OH/H$_2$O | 320/4.3/500 |
| 11 | Polymer/NH$_4$OH/H$_2$O | 360/7.5/576 |
| 12 | Polymer/NH$_4$OH/H$_2$O | 345/4.6/530 |
| 13 | Polymer/NH$_4$OH/H$_2$O | 345/4.7/530 |
| 14 | Polymer/NH$_4$OH/H$_2$O | 345/4.6/520 |
| 15 | Polymer/NH$_4$OH/H$_2$O | 340/5/530 |
| 16 | Polymer/NH$_4$OH/H$_2$O | 340/4.4/530 |
| 17 | Polymer/NH$_4$OH/H$_2$O | 340/4.2/530 |
| 18 | Polymer/NH$_4$OH/H$_2$O | 340/4/530 |
| 19 | Polymer/NH$_4$OH/H$_2$O | 340/4/530 |
| 20 | Polymer/NH$_4$OH/H$_2$O | 480/5/760 |

[1]The polymer is the reaction product of KF2001, MA and AA and/or MAA or MMA

TABLE 3

| Ex. | Ingredients | Wt % Ingredients | Tg° C. | Tape | Release g/inch Initial | Percentage Indicia receptivity |
|---|---|---|---|---|---|---|
| 1 | MA/KF2001/AA | 70/20/5 | 11 | A | 51 | 8 |
| 2 | MA/KF2001/AA | 70/25/10 | 16 | A | 10 | 75 |
| 3 | MA/KF2001/AA | 70/25/5 | 20 | A | 15 | 68 |
| 4 | MA/KF2001/MAA | 70/25/5 | 18 | A | 8 | 88 |
| 5 | MA/KF2001/MAA | 70/20/10 | 26 | A | 10 | 56 |
| 6 | MA/KF2001/MAA | 70/25/10 | 26 | A | 9 | 38 |
| 7 | MA/KF2001/MAA | 70/30/10 | 26 | A | — | 25 |
| 8 | MA/KF2001/MAA | 70/30/5 | ? | A | — | 22 |
| 9 | MA/KF2001/MAA/MAA | 60/25/10/5 | ? | A | — | 58 |
| 10 | MA/KF2001/MAA/MAA | 50/25/20/5 | 40 | A | 14 | 92 |
| 11 | MA/KF2001/MAA/MAA | 50/20/25/5 | 44 | A | 23 | 78 |
| 12 | MA/KF2001/MAA/MAA | 40/25/30/5 | 18 | A | 34 | 75 |
| 13 | MA/KF2001/MAA/MAA | 30/25/40/5 | 22 | A | 88 | 64 |
| 14 | MA/KF2001/MAA/MAA | 20/25/50/5 | 30 | A | 157 | 50 |
| 15 | MA/KF2001/MAA/MAA | 45/25/20/5 | 42 | A | 23 | 84 |
| 16 | MA/KF2001/MAA/MAA | 55/25/20/5 | 38 | A | 15 | 88 |
| 17 | MA/KF2001/MAA/MAA | 60/25/20/5 | 36 | A | 37 | 88 |
| 18 | MA/KF2001/MAA/MAA | 70/25/20/5 | 34 | A | 31 | 90 |
| 19 | MA/KF2001/MAA/MAA | 70/25/20/5 | 33 | A | 58 | 85 |
| 20 | MA/KF2001/MAA/MAA | 50/25/20/5 | 40 | B | 27 | 92 |

A = Acrylic
B = Rubber

EXAMPLE 21

The composition of Example 21 was prepared in the following manner:

First, a solvent borne sample was prepared by charging a 4 ounce glass bottle with 4 grams of 15K silicone macromer (SiMac), the preparation of which is described in U.S. Pat. No. 7,728,571, 16 grams ethyl methacrylate (EMA), 30 grams methyl ethyl ketone (MEK) and 0.06 g 2-2'-azobisbutyronitrile (AIBN). Thereafter, the contents of the bottle was purged with nitrogen gas for two minutes. Then the bottle was sealed and tumbled in a 55° C. water bath for 48 hours.

The sample was then diluted to 10% solids for coating. 40 grams of 40% solids polymer solution, 96 grams of toluene and 24 grams of isopropanol (IPA) were added to a 16 ounce wide mouth jar. The mixture was then shaken to form a homogenous mixture. The ingredients utilized in forming a solvent borne solution and the amount of the ingredients utilized are reported in Tables 4 and 5 respectively. The ingredients of the release coating, the weight percentage of the ingredients and the test results are reported in Table 6.

EXAMPLES 22-27

The copolymers of Examples 22-27 were prepared in accordance with the procedure outlined in Example 21. The ingredients utilized in forming a solvent borne solution and the amount of the ingredients utilized are reported in Tables 4 and 5 respectively.

TABLE 4

| Example | Ingredients Utilized in Polymerization | Amount of Ingredients Utilized (gms.) |
|---|---|---|
| 21 | 15KSIMAC/EMA/MEK/AIBN | 4/16/30/0.06 |
| 22 | 15KSIMAC/EMA/MMA/MEK/AIBN | 5/7.5/7.5/30/0.06 |
| 23 | 15KSIMAC/EMA/BMA/MEK/AIBN | 5/7.5/7.5/30/0.06 |
| 24 | 15KSIMAC/EMA/MA/MEK/AIBN | 5/7.5/7.5/30/0.06 |
| 25 | 15KSIMAC/MMA/BMA/MEK/AIBN | 5/7.5/7.5/30/0.06 |
| 26 | 15KSIMAC/EMA/ODA/MEK/AIBN | 5/11/4/30/0.06 |
| 27 | 15KSIMAC/EMA/MEK/AIBN | 5/7.5/7.5/30/0.06 |

TABLE 5

| Example | Ingredients Utilized In Preparation of Solvent-borne dilution | Amount of Ingredients Utilized (gms.) |
|---|---|---|
| 21 | polymer[2]/toluene/IPA | 40/96/24 |
| 22 | polymer/toluene/IPA | 40/96/24 |
| 23 | polymer/toluene/IPA | 40/96/24 |
| 24 | polymer/toluene/IPA | 40/96/24 |
| 25 | polymer/toluene/IPA | 40/96/24 |
| 26 | polymer/toluene/IPA | 40/96/24 |
| 27 | polymer/toluene/IPA | 40/96/24 |

[2]The polymer is the reaction product of the components listed in Table 5 for each example.

TABLE 6

| Ex. | Ingredients | Wt % Ingredients | $T_g°$ C. | Tape | Release g/inch Initial | Indicia % Toner Receptivity |
|---|---|---|---|---|---|---|
| 21 | EMA/15KSiMac | 80/20 | 47 | A | 34 | 88 |
| 22 | EMA/MMA/15 KSiMAC | 37.5/37.5/25 | 84 | A | 70 | 88 |
| 23 | EMA/BMA/15K SiMac | 37.5/37.5/25 | 41 | A | 61 | 90 |
| 24 | EMA/MA/15KSi Mac | 37.5/37.5/25 | 35 | A | 23 | 87 |
| 25 | MMA/BMA/15 KSiMac | 37.5/37.5/25 | 57 | A | 32 | 88 |
| 26 | EMA/ODA/15K SiMac | 55/20/25 | — | A | 91 | 96 |
| 27 | EMA/AA/15KSi Mac | 37.5/37.5/25 | 85 | A | 34 | 99 |

A = acrylic

EXAMPLE 28

Figure 1:
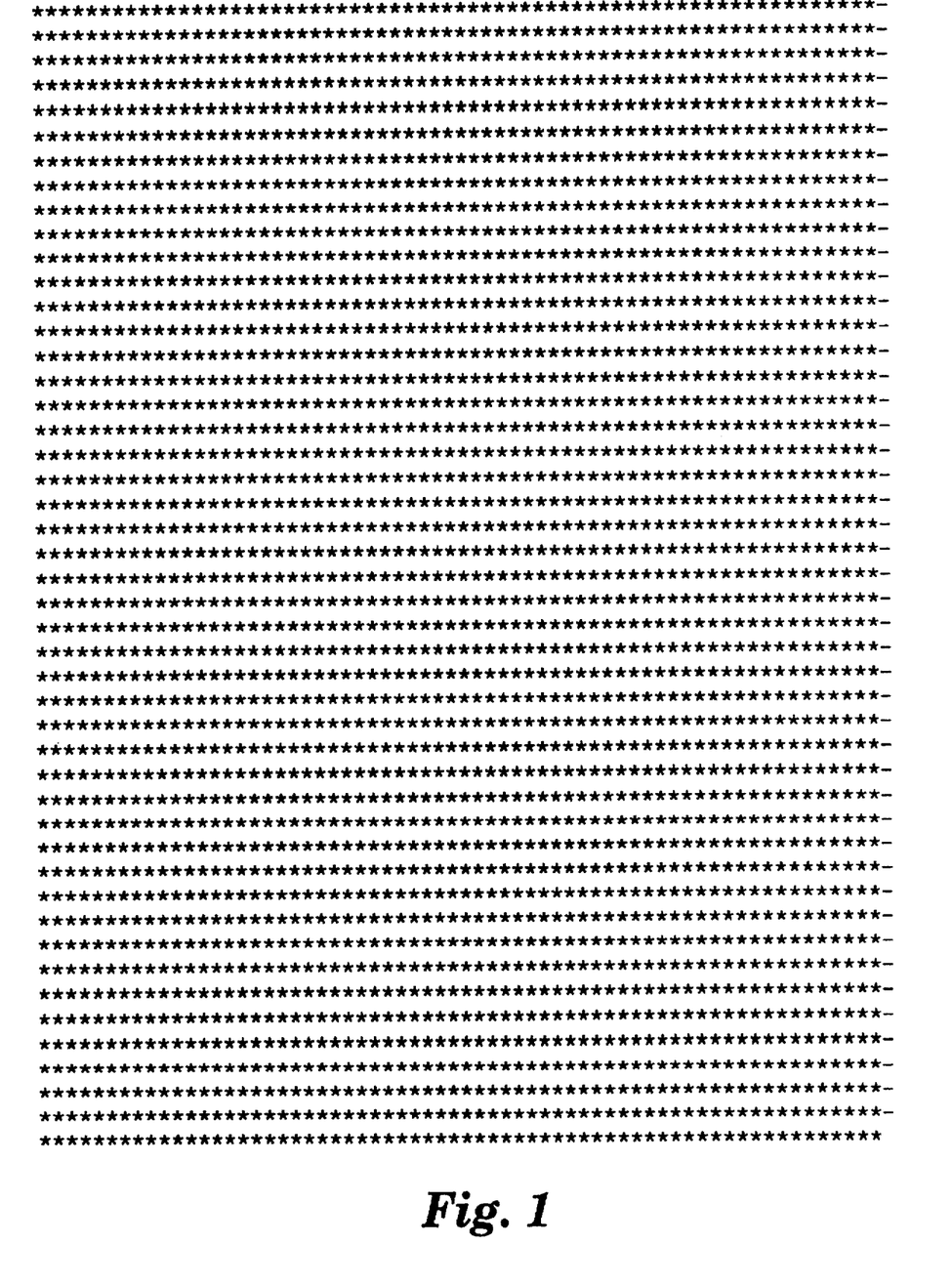
FIG. 1 is a representation of an embodiment of Applicants' invention tested in accordance with the procedures described below.

A sheet assembly particularly adapted to be printed on both sides in the of printers described above was made which had the structure illustrated in FIG. 1 except that four instead of two layers 16 of pressure sensitive adhesive placed in spaced relationship on each sheet 12 and 13. The sheets 12 and 13 were each 20 pound bond paper and were each about eight and one half by 11 inches in size, with the sheet 13 being slightly longer so that it projected about 0.1 inch past the edge 37. The layers 16 of pressure sensitive adhesive were microsphere structured copolymer adhesive described in U.S. Pat. No. 3,691,140 (Silver) dispersed in n-heptane at 8 percent solids. The layers of release coating 40 were crosslinked Syl Off 7676 coated at 20 percent solids in 2-butanone. The paper was first primed with a vinyl solution containing zinc oxide. The release coating 41 was a polymer described in U.S. Ser. No. 08/040876 Example 1, except the composition was KF2001/MA/MAA/MMA 25/50/20/5 dispersed in 2-butanone (Example 20) to 1.5 percent solids. The adhesive was coated to provide an adhesion comparable to Post-it® notes (i.e., approximated 0.6N/dm adhesion to glass) in 0.75-inch (1.9 cm) wide stripes 16 extending the full width of the sheets 12 and 13. The opposing strip of release coating 40 was coated with a gravure cylinder to provide 1.25-inch (3.2 cm.) wide stripes extending the full width of the sheets 12 and 13. The materials were coated on a wide web and subsequently converted and folded to form the sheet assemblies 10.

The initial release of the sheet was 166 g/in. Subsequently, the sheets were printed using ink jet, a xerographic, and offset printers. In each case, the test pattern was a solid block of black ink or toner. The ink jet printer was an HP 1200 C. color ink jet printer commercially available from Hewlett-Packard, Palo Alto, Calif. The xerographic printer was a Lanier 6540 copier commercially available from Lanier Worldwide, Inc., Atlanta, Ga.

The percent of inidicia receptivity were as follows:

| HP 1200 C | 100 percent |
|---|---|
| Lanier 6540 | 92 percent |

Figure 2:
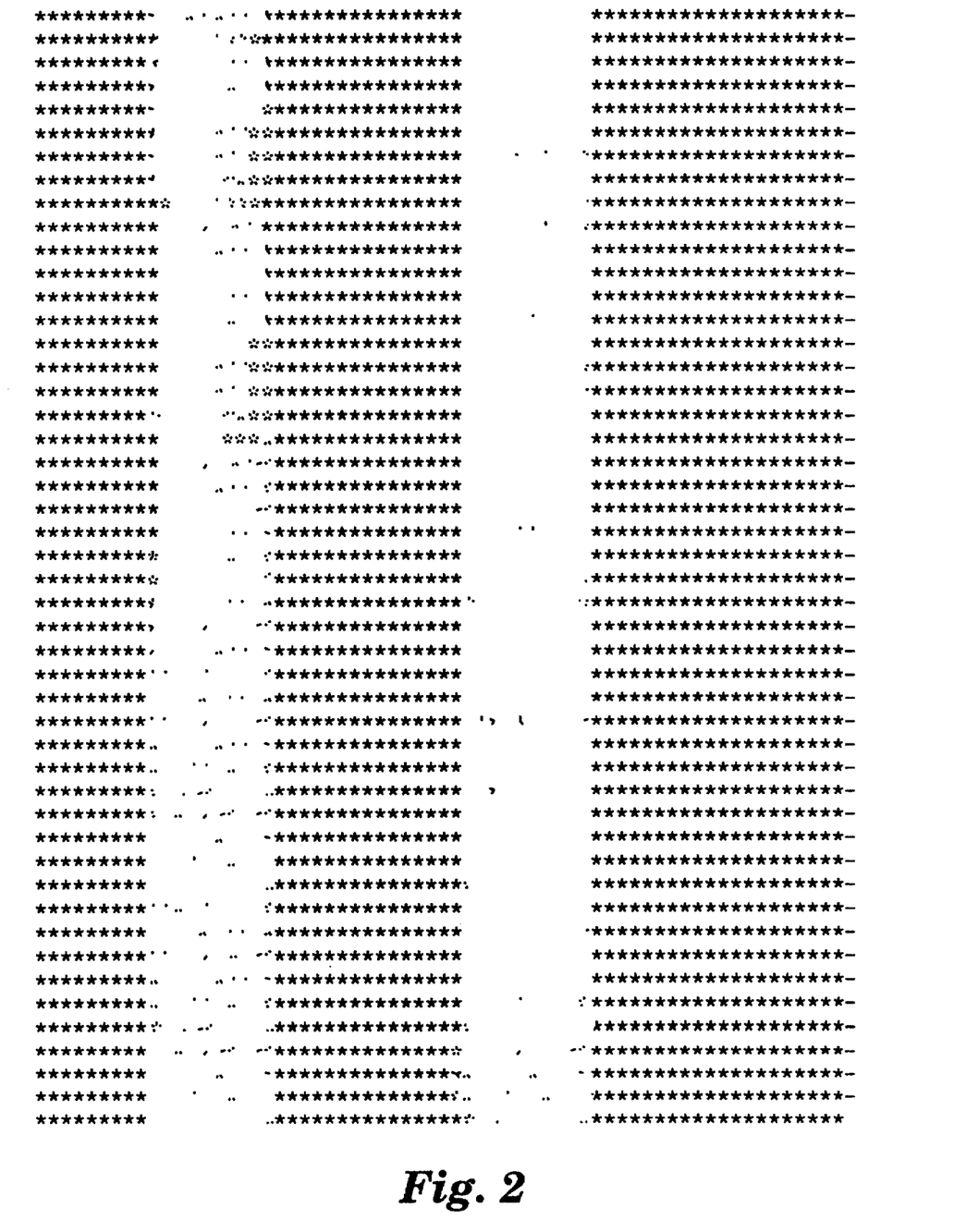
FIG. 2 is a representation of Avery 30-up stock #5160 that has been tested in accordance with the procedures described below.

The test results indicate that the release coating of the present invention anchors indicia much more effectively than the release coatings utilized in the Comparative Examples. Visually this is seen in a comparison of FIGS. 1 and 2 wherein the samples were tested in accordance with the Toner Receptivity Test described above. The asterisk pattern in FIG. 2 was not substantially anchored compared to Applicants' release coating shown in FIG. 1. Applicant's composition utilized in FIG. 1 comprises MA/MAA/MMA/KF2001 in the following amounts 50/5/20/25.

Thus, the coating of the present invention significantly decreases the attendant problems associated with indicia when printed and subsequently used as a stack of pressure-sensitive notes.

In summary, a novel article coated with a unique toner receptive release coating is described. Although specific embodiments and examples of the present invention have been described herein, it should be born in mind that these are by way of explanation and illustration and the present invention is not limited thereby. Certainly, modifications which are within the ordinary skill in the art are considered to lie within the scope of this invention as defined in the following claims including all equivalents.

We claim:

1. An image receiving article comprising:
   (a) a liner having a front face and a back face;
   (b) a layer of release coating coated over a portion of the front face of a liner wherein the release coating comprising a polymer having at least one vinyl polymeric segment having a $T_g$ between −10° C. and 65° C. present at a weight percent great enough to provide the copolymer with the capability of substantially anchoring toner particles emitted by an electrophotoconductive device and at least one siloxane polymeric segment having a number average molecular weight above about 100 and is present at a weight percent great enough to provide the copolymer with a surface release value not greater than about 11 Newtons/dm;
   (c) a layer of pressure sensitive adhesive; and
   (d) at least one layer of substrate having a front and a back face.

2. The image receiving article of claim 1 wherein said polymer of the release coating is a copolymer comprising having the formula:

wherein $R_1$ are monovalent moieties which can independently be the same or different and are selected from the group consisting of alkyl, aryl, alkaryl, alkoxy, alkylamino, hydroxyl, hydrogen, and fluoroalkyl;

$R_2$ can independently be the same or different and are divalent linking groups;

$R_3$ are monovalent moieties which can independently be the same or different and are selected from the group consisting of alkyl, aryl, alkaryl, alkoxy, alkylamino, hydroxyl, hydrogen, and fluoroalkyl;

$R_4$ can independently be the same or different and are divalent linking groups;

x is an integer of 0–3;

y is an integer of 10 or greater;

q is an integer of 0–3 ; and $G_5$ are monovalent moieties which can independently be the same or different selected from the group consisting of alkyl, aryl, alkaryl, alkoxy, alkylamino, fluoralkyl, hydrogen, and -WSA;

A is a vinyl polymeric segment or block consisting essentially of polymerized free radically polymerized monomer;

$G_6$ are monovalent moieties which can independently be the same or different selected from the group consisting of alkyl, aryl, alkoxy, alkylamino, fluoroalkyl, hydrogen and -WSA; and

$G_2$ and $G_4$ are A.

3. The image receiving article of claim 1 wherein said polymer of the release coating is a copolymer of D and E monomers copolymerized to form a polymeric backbone with F monomer grafted thereto
wherein D is at least one free radically polymerizable vinyl monomer;

E is at least one polar monomer copolymerizable with D, the amount of E being up to 30% of the total weight of all monomers, and F is a monomer having the general formula X is a vinyl group copolymerizable with the D and E monomers, Y is a divalent linking group where n is zero or 1;

m is an integer of from 1 to 3;

R is hydrogen, lower alkyl (e.g., methyl, ethyl, or propyl), aryl (e.g., phenyl or substituted phenyl), or alkoxy; and

Z is a monovalent siloxane polymeric moiety having a number average molecular weight above about 1,000 and is essentially unreactive under copolymerization conditions.

4. The image receiving article of claim 3 wherein said D monomer of the polymer of the release coating is selected from the group consisting of styrene, vinyl acetate, vinyl chloride, vinylidene chloride, acrylonitrile, acrylic or methacrylic acid esters of non-tertiary alcohols having from 1 to about 18 carbon atoms and mixtures thereof.

5. The image receiving article of claim 3 wherein said E monomer of the polymer of the release coating is selected from the group consisting of acrylic acid, methacrylic acid, itaconic acid, acrylamide, methacrylamide, N,N-dimethylacrylamide, methacrylonitrile and maleic anhydride.

6. The image receiving article of claim 1 wherein said substrate is labelstock.

7. A sheet assembly comprising a release coating on at least one nonadhesive bearing area of the rear surfaces of a sheet wherein the release coating comprises the formula:

wherein $R_1$ are monovalent moieties which can independently be the same or different and are selected from the group consisting of alkyl, aryl, alkaryl, alkoxy, alkylamino, hydroxyl, hydrogen, and fluoroalkyl;

$R_2$ can independently be the same or different and are divalent linking groups;

$R_3$ are monovalent moieties which can independently be the same or different and are selected from the group consisting of alkyl, aryl, alkaryl, alkoxy, alkylamino, hydroxyl, hydrogen, and fluoroalkyl;

$R_4$ can independently be the same or different and are divalent linking groups;

x is an integer of 0–3;

y is an integer of 10 or greater;

q is an integer of 0–3; and $G_5$ are monovalent moieties which can independently be the same or different selected from the group consisting of alkyl, aryl, alkaryl, alkoxy, alkylamino, fluoralkyl, hydrogen, and -WSA;

A is a vinyl polymeric segment or block consisting essentially of polymerized free radically polymerized monomer;

$G_6$ are monovalent moieties which can independently be the same or different selected from the group consisting of alkyl, aryl, alkoxy, alkylamino, fluoroalkyl, hydrogen and -WSA; and $G_2$ and $G_4$ are A.

* * * * *